United States Patent [19]
Nahra et al.

[11] Patent Number: 5,639,499
[45] Date of Patent: Jun. 17, 1997

[54] METHOD FOR TREATING FLUENT FOOD PRODUCT

[75] Inventors: John E. Nahra, Rockville; Artur G. Zimmer, Columbia, both of Md.

[73] Assignee: Dasi Industries, Inc., Rockville, Md.

[21] Appl. No.: 556,450

[22] Filed: Nov. 15, 1995

Related U.S. Application Data

[62] Division of Ser. No. 420,833, Apr. 11, 1995, Pat. No. 5,544,571.

[51] Int. Cl.⁶ ................................................ A23L 3/00
[52] U.S. Cl. ................................. 426/521; 426/522
[58] Field of Search .............................. 426/522, 521; 165/66; 99/452, 454, 467, 483; 261/116, 118

[56] References Cited

U.S. PATENT DOCUMENTS 4,310,476   1/1982   Nahra et al. .................... 426/522

*Primary Examiner*—George Yeung
*Attorney, Agent, or Firm*—Cushman Darby & Cushman IP Group of Pillsbury Madison & Sutro

[57] ABSTRACT

Sterilizing apparatus and a method including a stepped transition heat exchange bank is used to raise the temperature of a an incoming fluent food product before introducing the fluent food product to a sterilizing chamber in which the fluent food product is discharged in the form of a free-falling film; sterilizing steam is injected into the sterilizing chamber, all of which is absorbed by the fluent food product; from the sterilizing chamber, the food product with absorbed steam is passed to a vacuum chamber where part of the water in the fluent food product flashes to steam again and is removed for subsequent processing through heat exchangers and recirculation back to a steam generator upstream of the sterilizing chamber. The food product from the vacuum chamber is passed to a stepped heat exchange bank before passing to storage or packaging facilities.

8 Claims, 5 Drawing Sheets

METHOD FOR TREATING FLUENT FOOD PRODUCT

This is a division of application Ser. No. 08/420,833, filed Apr. 11, 1995, now U.S. Pat. No. 5,544,571.

BACKGROUND OF THE INVENTION

1. Field of the Invention

The present invention relates to an apparatus and method for sterilizing fluent materials while minimizing alteration of the natural flavor of the material and increasing the stability of these materials. The present invention is specifically directed to processing of a fluent product and, more specifically, milk and to a method where a major portion of the sterilizing medium is derived from the fluent product by evaporation, is condensed, reheated in a closed loop system and then reintroduced into a sterilizing chamber thereby isolating the fluent product from a source of possible contamination

2. Background of the Invention

A number of processes and apparatus have been developed in recent years for the purpose of heat treating fluent material, such as a dairy product, to improve the shelf life of the product without adversely affecting the organoleptic properties of the food product or its nutritional value. Included in the parameters of primary concern to early workers in this field were the maintenance of aseptic conditions while guaranteeing the thoroughness of the sterilization process as well as control of the flow parameters so as to assure the effectiveness of the sterilization. For certain fluent food products such as milk, careful handling of the product throughout the processing is mandatory not only for health reasons but also for the preservation of the desirable taste and other organoleptic properties of the fluent food product. As a consequence, the expense of sterilization has been a prominent factor in the marketability of the treated product.

Representative of the prior art in this regard are U.S. Pat. Nos. 4,310,476, Reissue 32,695 and 4,591,463.

While the prior art has succeeded in providing effective and safe sterilization of the fluent food and other products discussed in the foregoing prior art patents, it has been difficult to maintain the cost of the product to the consumer on a level competitive with non-sterilized products of a comparable type. Also, the process of sterilizing with a medium foreign to the type of fluent product has created the misapprehension on the part of some consumers that the product could be adulterated by the sterilizing medium. This has been particularly true where the food product is milk since, as noted in the references, this product has shown significant sensitivity to sterilizing techniques as well as sensitivity in the market place to price variations of even a small amount. Accordingly, it has been apparent that improvements would be required in the manufacturing process and apparatus in order to enable a producer to place on the market a sterilized fluent product such as milk which is safe, of high, consistent quality and at a competitive price. It is to this end that the present invention is directed.

SUMMARY OF THE INVENTION

According to the present invention, several modifications of the basic sterilizing process and apparatus such as disclosed in U.S. Pat. No. 4,310,476, the disclosure of which is incorporated herein by reference, have been made which either singly or in combination will appreciably reduce the production costs while preserving or enhancing the integrity of the fluent food product. These benefits come as a result of increased precision in the control of the flow of the product through the system while reducing the energy consumed to effect the transport and sterilization steps of the process. In a preferred form, a closed loop system will be employed to manage the sterilization medium thereby preserving a substantial portion of the energy used to raise the medium to the sterilizing temperature as well as to isolate the product from any possible contamination from external sources. Also, savings in terms of product costs are effected by the use of a specific type of heat exchanger to condition the fluent food product prior to and subsequent to the sterilization step. Additionally, by appropriate extraction of non-condensable gases from the sterilizing chamber, it has been found that the heat transfer efficiency of the process can be remarkably increased.

The foregoing and other advantages will become apparent as consideration is given to the following detailed description taken in conjunction with the accompanying drawings, in which:

DETAILED DESCRIPTION OF THE INVENTION

Figure 1A:
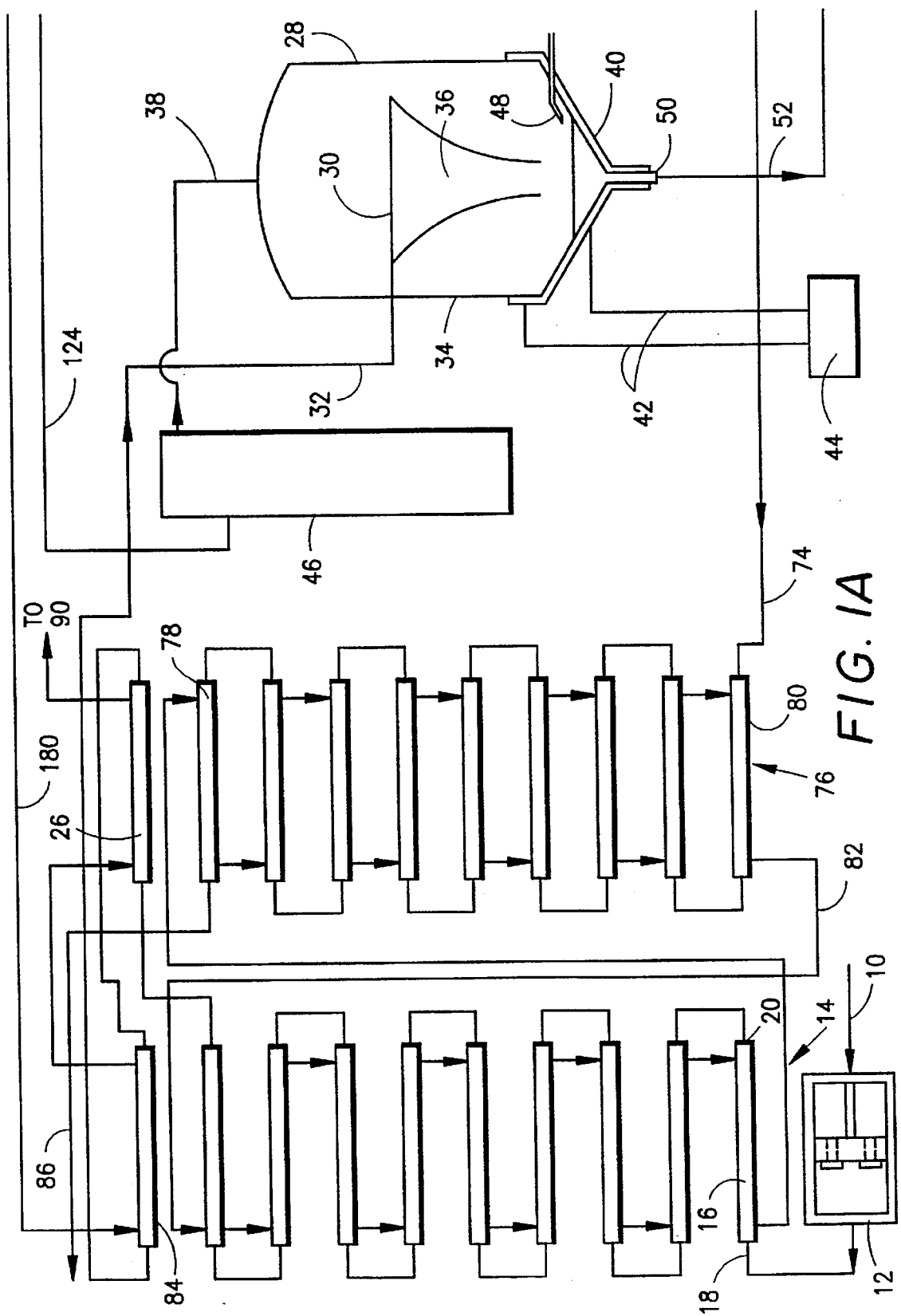
FIGS. 1A, 1B and 1C are schematic illustrations in flow chart form of the process of the present invention.
Figure 1B:
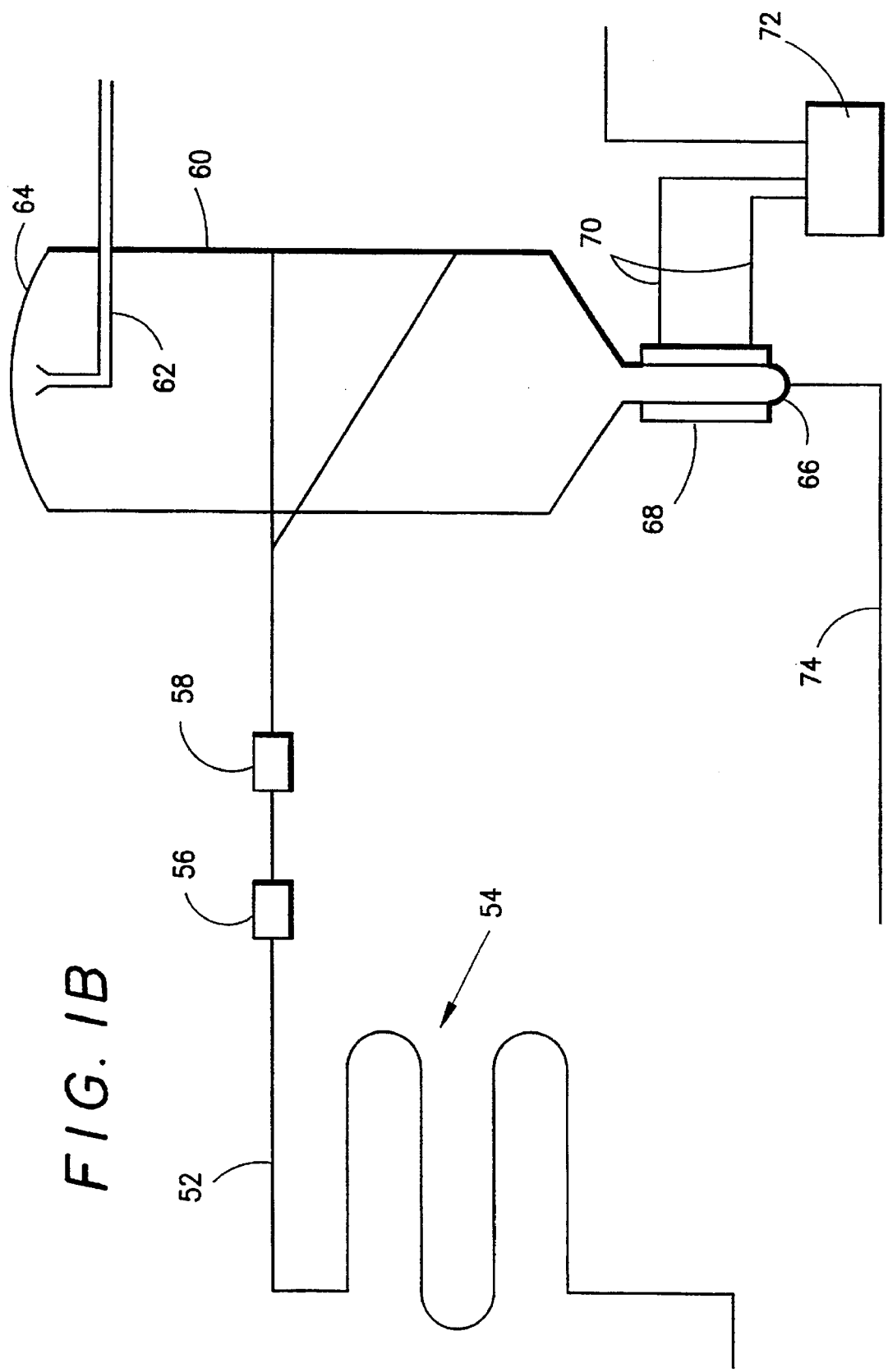
Figure 1C:
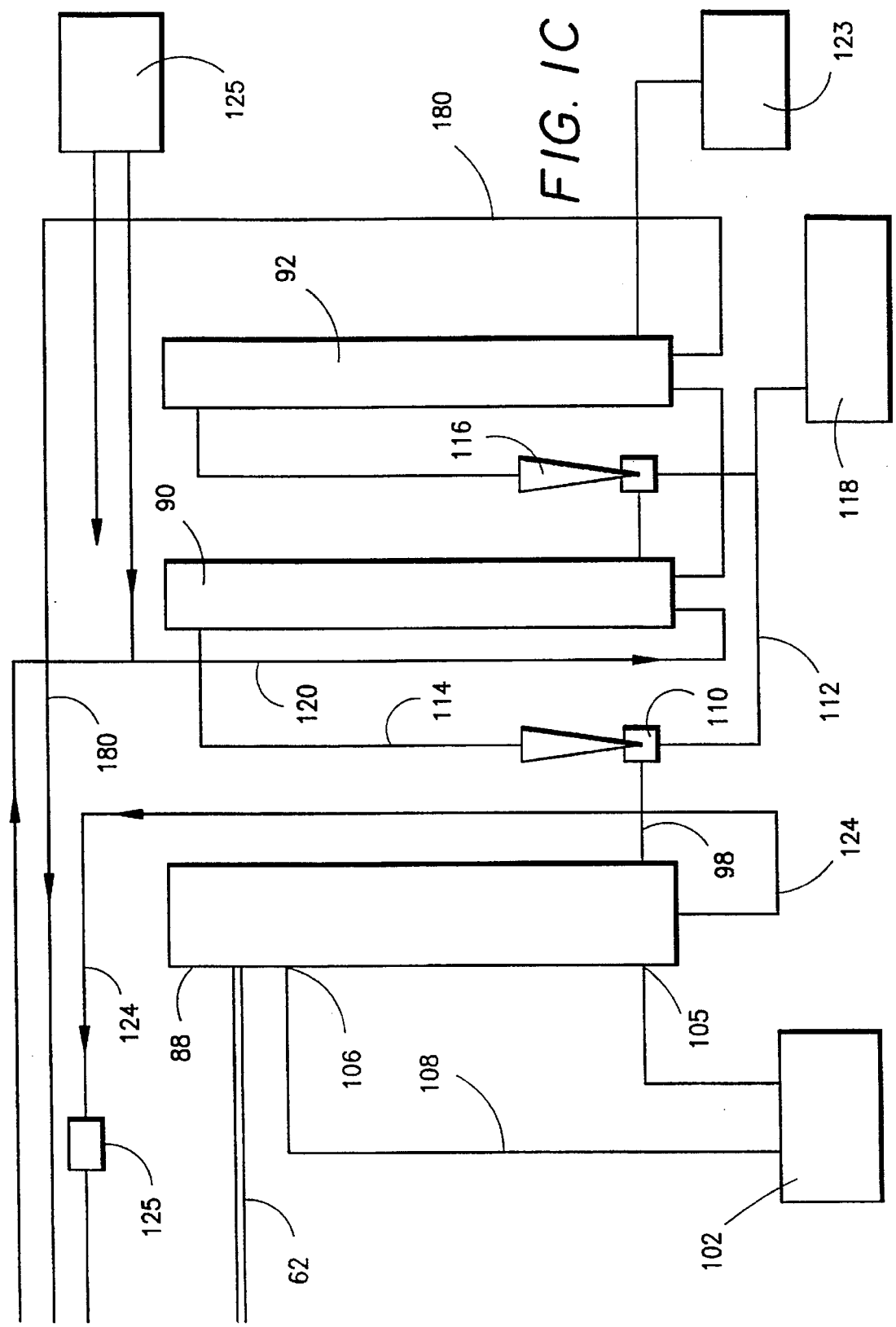

Turning now to the drawings wherein like numerals designate corresponding parts throughout the several views, there is shown in FIGS. 1A, 1B and 1C a schematic, flow chart view of the process and apparatus of the present invention. Referring, in particular, to FIG. 1A, there is shown an inlet conduit 10 which is connected upstream to a source of supply for the fluent product which may be a liquid food or other type of fluent material requiring sterilization. Conduit 10 is connected to a pump 12 which preferably is of the multiple piston, high pressure type rather than the turbine or blade type since a piston type pump has been shown to be more efficient in moving without slippage a fluent food product through a system such as is used in the present invention and will also provide better control of the velocity of the fluent food product in the system while minimizing damage to the product. The piston pump 12 shown is of the type having a chamber in which the piston reciprocates and which carries one or more flow passages closed on one side by one way valve members. Other types of piston pumps may be used. It will be understood that the process of this invention may be used with a wide variety of different fluent food products with little or no modification of the apparatus and in the following, milk will be referred to as the fluent food product by way of example.

From pump 12, the milk is fed to a bank of heat exchangers 14. According to the present invention, the heat exchanger bank 14 comprises a plurality of connected heat exchanger elements such as at 16. Each element 16 will preferably comprise central multi-tubular passageways for the milk food product entering at one end 18 and exiting the tubes at the opposite end 20. Along the tubes and surrounding the tubes is a chamber through which heated liquid such as hot water is passed from a downstream set of heat exchangers as described below. With this arrangement, the heating medium is continuously recirculated through the system to conserve energy and a gradual step up in temperature of the fluent food product will be achieved until the final heat exchange elements 26 and 84 are traversed by the food product before being introduced to the sterilizing chamber 28.

As has been disclosed in the earlier patents of the assignee and particularly U.S. Pat. No. 4,591,463, the sterilizing chamber will include one or more film-forming heads 30 which will receive the fluent food product from a conduit 32 which in a sealed manner passes through the wall 34 of the sterilizing chamber 18.

As has also been explained in the above-noted patents, the head 30 will deliver the fluent food product in a thin film by gravity flow from the distributing head generally in a free-falling film 36 which has proven to be particularly effective in terms of the interaction of the fluent food product, such as milk, with sterilizing steam which is introduced from a conduit 38, as discussed below. In this embodiment, the lower conical portion of the sterilizing chamber 28 is provided with a cooling jacket 40 which may be supplied with circulating cooling medium such as water, vegetable oil or air through conduits 42 supplied from a source 44.

The conduit 38 delivers sterile steam from a steam generator 46 which will be described in more detail below.

As explained in U.S. Pat. Nos. 4,310,476 and 4,591,463, it is important to the preservation of the organoleptic properties of milk as well as other fluent food products that the exposure to heat be maintained in as short a possible interval consistent with the desired level of sterilization which is defined generally in terms of reduction in active bacteria level. Baffle means as disclosed in the above noted patents may be mounted within said pressure vessel for reducing the flow velocity of the heated gas within said vessel to achieve rapid heating of the film of fluent material while subjecting the film to minimum physical perturbation. In the present invention, it has been discovered that the heat transfer efficiency between the fluent food product such as milk and steam can be significantly increased by the removal of inert gases particularly those that are non-condensable and which are generated in the sterilizing chamber from the steam source but which may also be generated as the milk is heated. To counteract this, the present invention provides a vent 48 through the lower half of the sterilizing chamber 28 as shown in FIG. 1A and in more detail in FIG. 2. This will be in addition to the vent located in the upper portion of the chamber. It is estimated that the increase in heat transfer efficiency will be on the order of 50% upon the removal of the non-condensable gases in the lower portion of the chamber 28 thus significantly reducing the time and the steam pressure the milk need be exposed to in the chamber 28.

The bottom of the chamber 28 is provided with an outlet 50 connected to a conduit 52 through which the now heated liquid food product is fed, as shown in FIG. 1B, through a holding tube as indicated at 54 for the purpose of retaining the milk product in the conduit 52 for a specified and controllable period. By insulating the conduit 52, heat will be retained in the fluent food product during its passage through the section 54 until the conduit 52 terminates at a flow control device 56 which is preferably of the variable orifice type 58 which operates in stepped transitions and may be followed by a fixed orifice flow control device 56 which is located immediately upstream of a vacuum chamber 60. The purpose of the variable orifice control device 58 is described in prior U.S. Pat. No. 4,591,463 and which will be summarized below. The opening of the orifice 58 is selected to provide the dwell time necessary to complete sterilization to the desired level in the conduit 52 upstream of the variable orifice flow control device 58. In some circumstances, the fixed orifice 56 may be eliminated which is desirable since it has been the practice to provide cooling water to this orifice to maintain its constant cross sectional flow area. With a variable orifice flow control device 58 which is shown in more detail in FIG. 4, as discussed below, this necessity is eliminated.

Downstream of the device 58 is the vacuum chamber 60 which is maintained at approximately 250 millibar absolute. As a result, any water taken up by the fluent food product, such as milk, will flash to steam upon exposure to the vacuum in the chamber 60. This will also have the effect of rapidly cooling the fluent food product. Under these conditions, the steam will be drawn off through a collector 62 located adjacent to the top 64 of the chamber 60 while the fluent product will collect in the bottom neck portion 66 of the chamber 60. A cooling jacket 68 is preferably provided about the bottom neck portion 66 of the chamber 60 to prevent reboiling of the fluid. Water will be supplied to the jacket 68 by conduits 70 from a supply 72. From the portion 66, a conduit 74 is provided to connect the fluent product to a piston type homogenizing pump (not shown) which will deliver the fluent product to a bank of heat exchange tubes 76 which are preferably also of the tubular form. The heat exchange fluid may be process, i.e. non sterile, water from a suitable source which is delivered to the topmost tube 78 of the bank 76. The lowermost tube 80 has the heat exchange fluid such as water delivered by a conduit 82 to the uppermost heat exchange tube 84 of the heat exchange bank 14. With this arrangement, the residual heat in the fluent food product will be used to warm the incoming fresh fluent product from line 10 in a gradual, stepwise manner and makes use of the recirculation of the heating medium acheiving, as will be apparent, a useful energy saving in the arrangement of the dual heat exchange banks 14 and 76 as described above.

From the uppermost heat exchange tube 78, the cooled fluent food product is fed by conduit 86 to an aseptic storage or directly to packaging equipment.

With reference now to FIG. 1C, there is shown an arrangement of heat exchange elements 88, 90 and 92. Element 88 is used to recapture the culinary steam used to sterilize the food product and is fed by conduit 62 from the vacuum chamber 60. The steam is condensed in heat exchange element 88 which is cooled by process water from source 102. Passage of the cooling fluid will be vertically upwardly from the inlet 105 to the outlet 106 adjacent the upper portion of heat exchanger 88 where the now warmed cooling fluid is returned by conduit 108 to the supply 102. The condensed steam is fed as water back through conduit 124 and a filter 125 to the steam generator 46. Heat exchange elements 90 and 92 are used to capture the non-condensable gases which are removed from the lower end of heat exchange element 88. The cooled gases are drawn off from the element 88 through tube 98 and delivered to the inlet end of heat exchange element 90. The now cooled gas stream is passed through the tube 98 to a Venturi pressure recompressor 110 which is fed through conduit 112 with saturated steam from a source 118 and this will have the effect of drawing off the gases from the heat exchanger 88 and facilitate passage through conduit 114 to the inlet of the second heat exchange element 90. The subsequent heat exchanger 92 is similarly equipped with an upstream located Venturi pressure recompressor 116 fed from the saturated steam source 118. A separate water supply 120 may be employed as the cooling fluid in the downstream heat exchangers 90 and 92. The cooled non-condensable gases are removed at 123 for optional use in other processes. The heat in the steam extracted from the heat exchange elements 90 and 92 is passed through conduit 180 to heat exchanger 26 thereby effecting a 10 to 15% energy saving in the operation of the system.

Once the system is charged, the sterilizing heating medium, culinary steam, is utilized in a closed loop without contamination from any external source except by contact with the food product in the sterilizing chamber 28. Moreover, water naturally present in some fluent food products such as milk will provide a quantity of the liquid to generate steam in the vacuum chamber 60 and which will be reintroduced into the food product in the sterilizing chamber 28. As a consequence, the cost of purifying the liquid introduced into the steam generator 46 is significantly reduced while the sterile handling of the food product is greatly facilitated. Any make-up water that is required as a result of heat losses to the atmosphere and due to removal of non-condensable gases can be supplied from a potable source 125 which intercepts line 124 at a convenient junction upstream of the steam generator 46.

Figure 2:
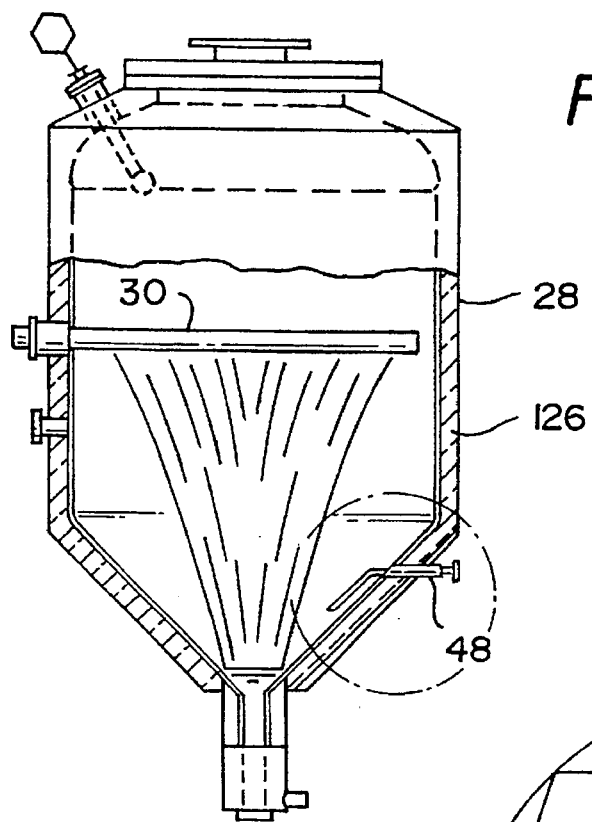
FIG. 2 is an enlarged view, partly in section, of the sterilizing chamber of the present invention.
Figure 3:
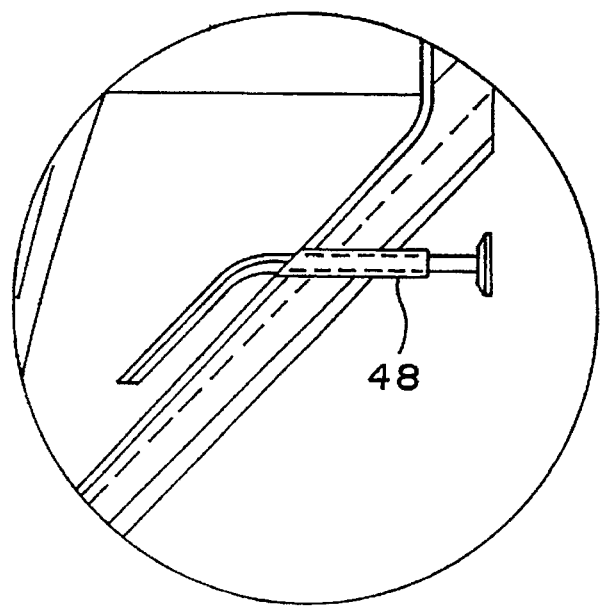
FIG. 3 is an enlarged detailed view of the circled portion of FIG. 2.

With reference to FIG. 2, there is shown in enlarged detail view, partly in section, the sterilization chamber 28 which has the exterior coated with an insulating jacket 126 and the non-condensable gas vent tube 48 installed in the lower conical portion of the chamber 28.

The free-falling film distributor head 30 is constructed preferably as in U.S. Pat. No. 4,419,301 although other constructions may be employed so long as a thin, free-falling film is achieved in operation.

Figure 4:
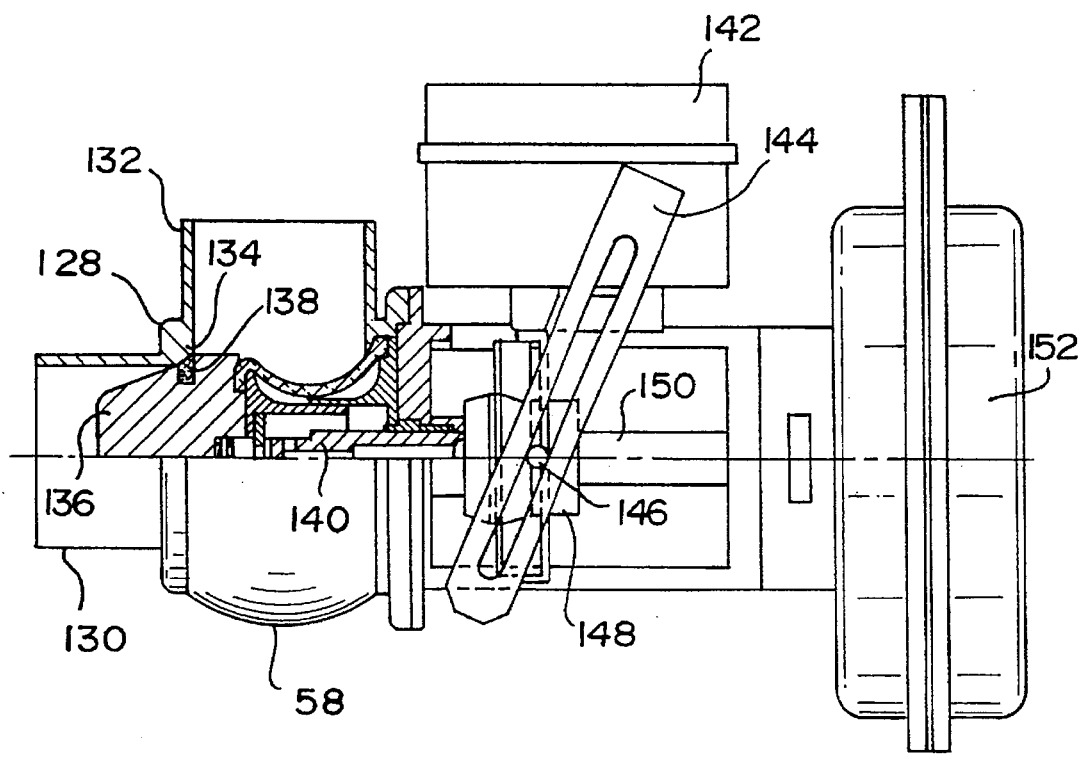
FIG. 4 is an enlarged view of a flow control device of the present invention.

In FIG. 4, there is shown a detailed view of the variable orifice flow control device 58. This is preferably of a type that is commercially available and includes a L path 128 having an inlet 130 and an outlet 132 and a seat 134 against which is movable a closure plug 136 which is preferably of the type having a sealing member 138 provided about its periphery to engage the seat 134 in a sealing manner. The plug 136 is mounted on a movable piston 140 which may be actuated by a pressure actuator 152 to move toward and away from the seat 128. In the illustrated embodiment, the signal arm 144 is connected by a pin 146 to a collar 148 slidably mounted on a rod 150. Movement of the arm 144 transverse to the axis of the rod 150 will send a signal to the control box 142 which reports to the pressure actuator 152 to effect control of the opening and closing of the passage through the L path 128. This arrangement which is commercially available will compensate for air pressure variations and other process variations by comparing a detected value to intended positions. If not in agreement, the control box actuates the pressure actuator 152 to compensate. With this arrangement, movement of the collar 148 will effect the corresponding movement of the plug 136 to adjust the size of the opening about the plug 136 and, as a consequence, the flow through the device 58 to the vacuum chamber 60. The control device 58 may be connected to the pressure sensors 152 for the vacuum chamber 60 to correlate the size of the opening through the device 58 to the vacuum chamber 60.

Figure 5:
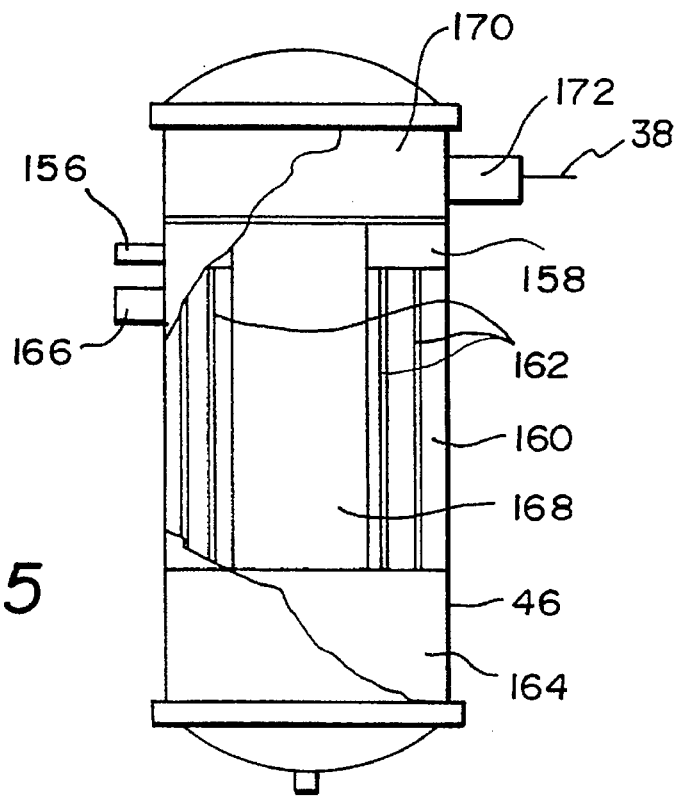
FIG. 5 is an enlarged detailed view of the steam generator of the present invention.

In FIG. 5, there is shown schematically the steam generator 46 which is in the form of a pressure vessel which includes an inlet 156 which feeds an annular chamber 158. A second annular chamber 160 includes a plurality of closely spaced tubes, some of which are indicated at 162. Each tube has an upper end in communication with chamber 158 and a lower end in communication with a chamber or plenum 164. Chamber 160 is fed with a heat exchange medium through inlet 166 in the illustrated embodiment. This may be hot oil or high pressure steam. With this operation, the liquid from heat exchanger 88 which is usually at a somewhat elevated temperature of approximately 65° C. is introduced through the inlet 156 and passes from chamber 158 down through tubes 162 where the liquid is heated and evaporated by the heat exchange medium 166. Due to liquid recirculation, much of the liquid introduced through the inlet 156 will enter the plenum 164 as liquid. Another source of water for the plenum may also or in the alternative be provided. With this arrangement, the steam that is generated as a result of heat exchange relationship through the walls of the tubes 162 with the medium 166 will always be saturated steam which rises through the central vertically extending chamber 168 to chamber 170 where the steam is passed through an outlet 172 to conduit 38 and then to the sterilizer 28. While the heat exchange medium introduced at 166 may be steam or a hot fluid, other means for heating the fluent material introduced through 156 may be employed including a gas fire, electrical current or the like. It will be apparent, however, that the medium entering through inlet 156 is kept separated from the medium introduced through inlet 166 so that the integrity of the culinary steam will be preserved.

Having desribed a preferred embodiment, it will be apparent that various modifications may be made thereto without departing from the scope of the invention as described in the appended claims.

What is claimed is:

1. A method of treating a fluent food product comprising the steps of gradually raising the temperature of the fluent food product from a storage temperature to a temperature substantially elevated with respect to said storage temperature but below a sterilizing temperature including passing the food product through a plurality of heat exchange devices which are connected in series and then delivering the fluent food product to a sterilizing chamber for sterilization of the food product, and removing any derived non-condensable gases from said sterilizing chamber through vent means.

2. The method as claimed in claim 1 wherein said sterilizing step comprises the step of exposing the food product while in a falling film form to saturated steam.

3. A method of treating a fluent food product which contains water comprising the steps of delivering the food product to a distribution head in a sterilizing chamber, exposing the food product while in a free falling film form to sterilizing steam, removing the treated food product from the sterilzing chamber and passing the food product to a vacuum chamber maintained at low pressure whereby part of the water in the food product will vaporize, drawing off the vaporized water and recirculating the vaporized water to the sterilizing chamber.

4. The method as claimed in claim 3 wherein the vaporized water is passed to condensing means and heating means before recirculating to the sterilizing chamber.

5. The method as claimed in claim 4 including the step of maintaining a water supply in said heating means to provide saturated steam to said sterilizing chamber.

6. The method as claimed in claim 4 including the step of using a closed loop conduit system for the vaporized water between the sterilizing chamber and said vacuum chamber.

7. A method of treating a fluent food product comprising the steps of gradually raising the temperature of the fluent food product from a storage temperature to a temperature substantially elevated with respect to said storage temperature but below a sterilizing temperature by passing the food product through a plurality of heat exchange devices which are connected in series and then delivering the fluent food product to a sterilizing chamber for sterilization of the food product and including the step of removing any derived non-condensable gases from said sterilizing chamber through vent means.

8. The method as claimed in claim 7 wherein said sterilizing step comprises the step of exposing the food product while in a falling film form to saturated steam.

* * * * *